United States Patent [19]

Cline

[11] Patent Number: 5,710,659
[45] Date of Patent: Jan. 20, 1998

[54] LOW TILT, HIGH GAIN FIBER AMPLIFIER

[75] Inventor: Terry William Cline, Bethlehem Township, Northampton County, Pa.

[73] Assignee: Lucent Technologies Inc., Murray Hill, N.J.

[21] Appl. No.: 574,472

[22] Filed: Dec. 19, 1995

[51] Int. Cl.$^6$ ............................ H01S 3/30; G02B 6/34
[52] U.S. Cl. ............................................ 359/341; 359/337
[58] Field of Search ................................. 359/134, 160, 359/174, 37, 341, 347; 385/10

[56] References Cited

U.S. PATENT DOCUMENTS

| | | | |
|---|---|---|---|
| 5,142,660 | 8/1992 | Chang et al. | 385/10 |
| 5,200,964 | 4/1993 | Huber | 359/341 |
| 5,218,608 | 6/1993 | Aoki | 372/6 |
| 5,218,655 | 6/1993 | Mizrahi | 385/39 |
| 5,253,104 | 10/1993 | Delavaux | 359/341 |
| 5,271,024 | 12/1993 | Huber | 372/6 |
| 5,287,216 | 2/1994 | Chirravuri et al. | 359/341 |
| 5,416,865 | 5/1995 | Fielding | 385/32 |
| 5,532,864 | 7/1996 | Alexander et al. | 359/177 |

OTHER PUBLICATIONS

Lipka et al, Electr. Lett., vol. 30, N23, Nov. 10, 1994, pp. 1940–1941; abst. only herewith.

*Primary Examiner*—Nelson Moskowitz
*Attorney, Agent, or Firm*—Scott W. McLellan; Lester H. Birnbaum

[57] ABSTRACT

An optical amplifier having high overall gain and low gain tilt, useful in an optical transmission system or the like. The amplifier has a doped optical fiber as the amplification medium and two pumps, the shorter wavelength one propagating with the signal being amplified and the longer wavelength one propagating opposite the signal being amplified. A wavelength selective reflective fiber grating is disposed along the doped fiber to reflect the second pump signal. The addition of the grating allows the amplifier to have a higher gain with a lower gain tilt than amplifiers without the grating. Positioning the grating along the fiber allows for the control of the overall gain with respect to the gain tilt for a given fiber length.

13 Claims, 2 Drawing Sheets

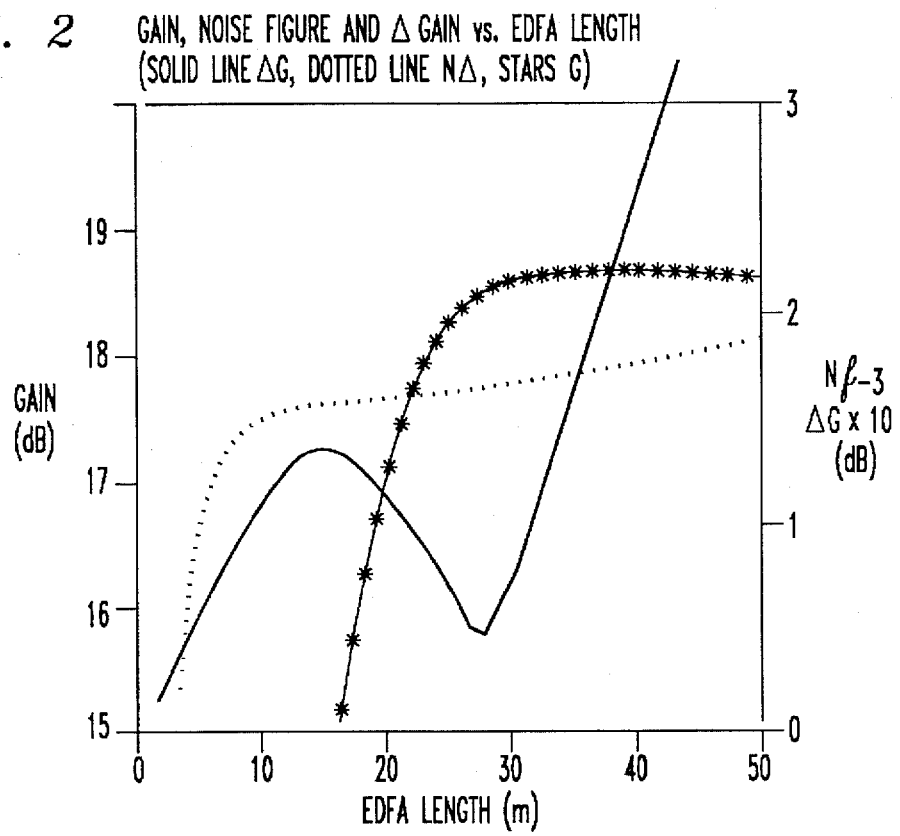
FIG. 2 GAIN, NOISE FIGURE AND Δ GAIN vs. EDFA LENGTH
(SOLID LINE ΔG, DOTTED LINE NΔ, STARS G)
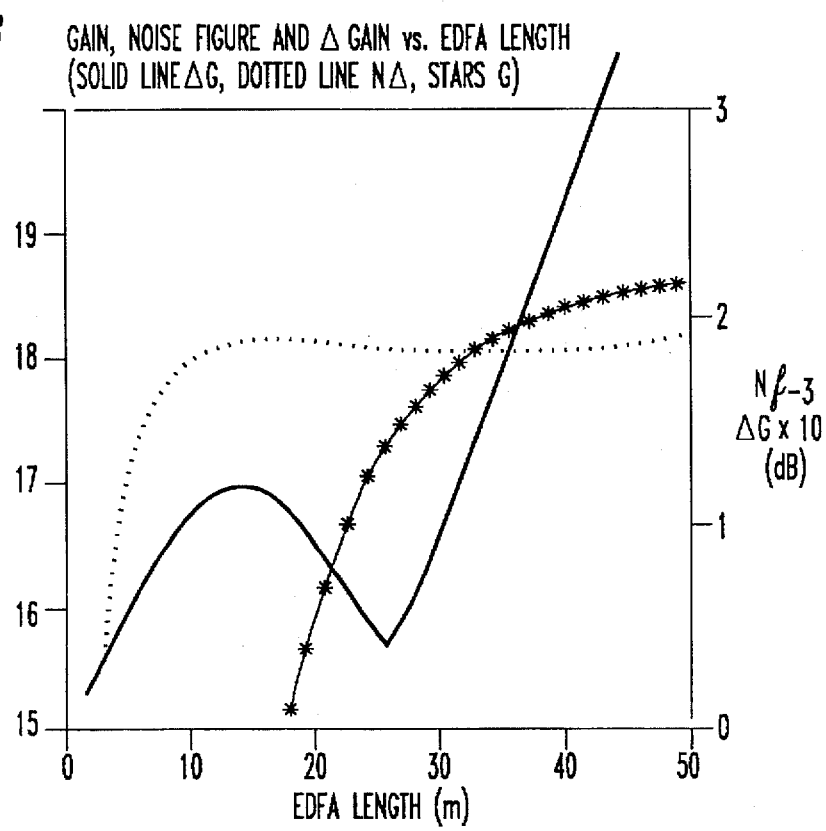
FIG. 3 GAIN, NOISE FIGURE AND Δ GAIN vs. EDFA LENGTH
(SOLID LINE ΔG, DOTTED LINE NΔ, STARS G)

LOW TILT, HIGH GAIN FIBER AMPLIFIER

BACKGROUND OF THE INVENTION

1. Field of the Invention

This invention relates to fiber amplifiers in general and, more particularly, to dual pumped rare-earth doped fiber amplifiers.

2. Description of the Prior Art

In long-haul digital and analog (CATV) systems, fiber amplifiers are becoming more widely used. Particularly in analog systems, fiber amplifiers are essentially the only option for amplifying signals being distributed from a head end source to multiple drops (customers). But in both digital and analog applications, amplifier linearity, noise, and gain must be balanced to achieve the desired system requirements.

To provide both low-noise and high gain in rare-earth doped fiber amplifiers, such as erbium-doped fiber amplifiers, two lasers (pumps) of different wavelengths may be applied to the amplifying medium, one pump signal (usually the one with the shorter wavelength) propagates with the signal to be amplified (co-propagating), while the other pump signal propagates oppositely the signal to be amplified (counter-propagating). An example of one such amplifier is shown in U.S. Pat. No. 5,140,456. This kind of amplifier has the advantages of low noise and high gain but suffers from a distortion known as gain tilt.

Gain tilt is the measure of the slope of the wavelength dependent gain of a fiber amplifier. See "Gain Tilt of Erbium-Doped Fiber Amplifiers Due to Signal-Induced Inversion Locking" by Hansen et al., IEEE Photonics Technology Letters, Vol. 5, No. 4, April 1993, pp. 409–411, included herein by reference, as an explanation of gain tilt and how it is measured.

One effect of gain tilt on an optical signal being amplified is an amplitude modulation of the optical signal (an unwanted distortion) by any wavelength variation in the optical signal. The distortion may be more noticeable where the optical signal source is a direct modulated laser. Such lasers suffer from an optical signal wavelength "chirp" in response to the modulation signal applied to the laser.

To reduce the effect of gain tilt, the level of the pump signals and the length of the doped fiber amplifier may be adjusted to achieve a low gain tilt but at the cost of lower overall gain and higher noise figure. Referring to FIG. 3, an exemplary plot of the gain tilt, noise figure, and overall gain verses the length of the doped fiber amplifier of the type disclosed in the above-identified U.S. Patent is shown. Where the gain tilt is the lowest, the overall gain is more than two dB lower than the maximum plotted gain. It has been found that the overall gain reduction may not satisfy the system requirements for many applications, particularly CATV applications. While not shown here, the same effect has been found by varying the amplitudes of the pump signals.

Thus, it is desirable to provide an optical amplifier design with high overall gain with low gain tilt. It also desirable to provide an optical amplifier design that allows for the adjustment of the overall gain of the amplifier for a given gain tilt.

SUMMARY OF THE INVENTION

These and other aspects of the invention may be achieved generally in an optical amplifier for amplifying an information signal. The amplifier has a doped fiber amplifying medium, and first and second pumps. The doped fiber amplifying medium has an input coupling to the input of the amplifier and an output coupling to the output of the amplifier. The first pump, coupling to the input of the amplifying medium, generates a co-propagating pump signal of a first wavelength and the second pump, coupling to the output of the amplifying medium, generates a counter-propagating pump signal of a second wavelength. Added to the amplifier is a frequency selective reflector, disposed along the amplifying medium to form first and second portion lengths thereof. The reflector reflects substantially all of the counter-propagating pump signal while passing the first pump signal and the information signal. The addition of the grating allows the amplifier to have higher gain with low gain tilt than amplifiers without the grating. Setting the overall length of the fiber and positioning the grating along the fiber allows for the control of the overall gain with respect to the gain tilt.

The above-described amplifier is also discussed in connection with an optical transmission system.

BRIEF DESCRIPTION OF THE DRAWING

The foregoing features of this invention, as well as the invention itself, may be more fully understood from the following detailed description of the drawings, in which:

FIG. 2 is a plot of the simulated overall gain, noise figure, and gain tilt of the exemplary doped fiber amplifier embodiment of FIG. 1; and FIG. 3 is a plot of the simulated overall gain, noise filter, and gain tilt of an exemplary prior art doped fiber amplifier.

DETAILED DESCRIPTION

Figure 1:
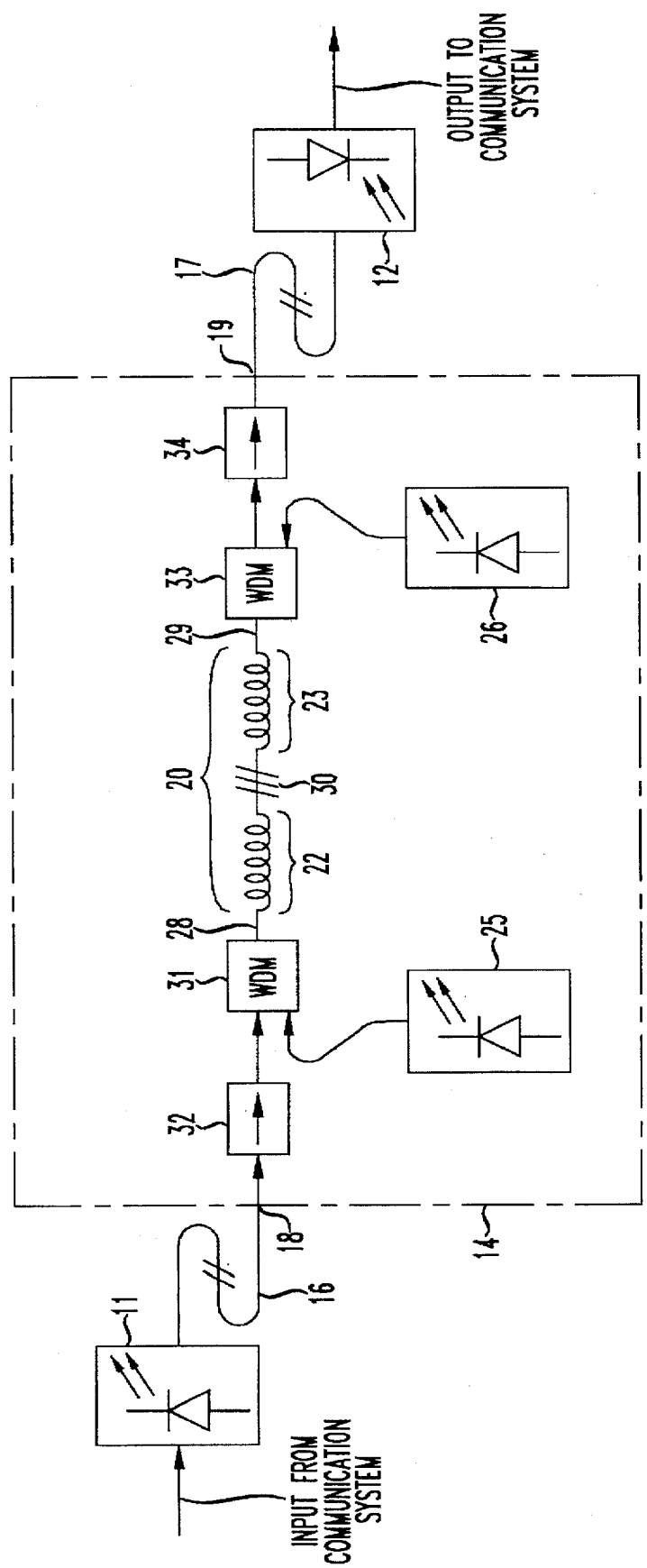
FIG. 1 is a simplified block diagram of an exemplary optical transmission system utilizing an exemplary embodiment of an improved doped fiber amplifier.

Referring to FIG. 1, an exemplary optical transmission system 10 is diagrammed. In general, the system 10 includes an optical transmitter 11, a receiver 12, and an optical amplifier 14. The amplifier 14 has an input 18 and an output 19, for amplifying an information signal from the transmitter 11. The amplifier 14 has a doped fiber amplifying medium 20, and first and second pumps 25, 26. The doped fiber amplifying medium 20 has an input 28 coupling to the amplifier input 18 and an output 29 coupling to the amplifier output 19. The first pump 25, coupling to the amplifying medium input 28, generates a co-propagating pump signal of a first wavelength and the second pump 26, coupling to the amplifying medium output 29, generates a counter-propagating pump signal of a second wavelength. Added to the amplifier 14 is a frequency selective reflector 30, disposed along the amplifying medium 20 to form a first portion length 22 and a second potion length 23. The reflector 30 reflects substantially all of the counter-propagating pump signal while passing the first pump signal and the information signal.

In more detail, the exemplary optical transmission system 10 further includes optical fibers 16 and 17 to couple the information signal from transmitter 11 (shown here as a laser diode but could be any type of optical transmitter) to the amplifier 14 and on to the receiver 12 (shown here as a photodiode but could be any type of optical receiver).

As stated above, amplifier 14 includes an optical amplifying medium, here an exemplary erbium-doped fiber 20 (although any type of optical amplifying fiber amplifier could be used) which is divided into a first portion 22 and a second portion 23 by reflective fiber grating 30. The purpose of grating 30 will be discussed in more detail below, but it is sufficient to state here that the grating is used to reflect the pump signal that counter-propagates in the second portion 23 to enhance the amplifying ability of the portion 23.

The first pump signal generator 25, here a laser operating at an exemplary wavelength of 980 nm for the exciting the erbium dopant, is coupled to the fiber 20 through a wavelength division multiplexer (WDM) 31 along with the information signal from transmitter 11 through exemplary isolator 32. Similarly, the second pump signal generator 26, here a laser operating at an exemplary wavelength of 1480 nm, is coupled to the fiber 20 through a WDM 33. The first pump signal propagates with the information signal (co-propagating) while the second pump signal propagates in the fiber 20 against the information signal (counter-propagating). The amplified information signal from the output 29 of the fiber 20 passes through the WDM 33 and exemplary isolator 34 to receiver 12. It is noted that the WDM and isolator combinations could be combined into a three-port hybrid isolator or the like. Moreover, the amplifier 14 may or may not contain the isolators 32, 34 or the pumps 25, 26. Further, there may be interposed isolators, and input/output optical amplifier monitoring taps (not shown) between the pumps and the corresponding WDMs.

As mentioned above, reflective grating 30 serves to reflect the second pump signal (e.g., 1480 nm pump signal) back through the second portion 23, increasing the effective amplifying capability of the portion 23 in response to the second pump signal. The first pump signal continues through the entire length of the fiber 20, along with the information signal. It has been found that the addition of the grating 30 allows the amplifier to have a higher gain with a lower gain tilt than amplifiers without the grating. Choosing the total length of the fiber 20 and the ratio of the first portion 22 to second portion 23 gives flexibility to the designer of an amplifier to determine the desired overall gain of the amplifier 14 for a given gain tilt, as well as noise figure, etc., for a given pump power. For a given fiber 20 length, the position of the grating along the fiber affects the overall gain with respect to the gain tilt.

The above advantage can be seen from FIG. 2. Here the gain, noise filter, and tilt of the amplifier is plotted with respect to the length of the fiber 20 with the position of the reflective grating 30 along the fiber 20 set to have the portion 22 at 30% of the total length. The desired performance occurs with the fiber length at about a length of 27 meters. This length and percentage has been found to provide substantially the best overall performance of the exemplary amplifier 14 for various positions of the grating 30 and fiber 20 length, as will demonstrated below.

Using an exemplary first pump 25 wavelength of 980 nm at 70 mW, a second pump 26 wavelength of 1480 nm at 80 mW, and a 1550 nm optical input signal at one row, the following values of gain, tilt and noise figure (NF) were found for the various positions of the grating 30, expressed as the ratio of the length of the portion 22 to the total length of fiber 20 in percent, at indicated fiber 20 length resulting in the lowest tilt value:

| position of grating 30 | gain (dB) | tilt (dB/nm) | NF (dB) | fiber 20 length (m) |
| --- | --- | --- | --- | --- |
| no grating (FIG. 3) | 16.97 | 0.0385 | 4.87 | 25 |
| 30% (FIG. 2) | 18.36 | 0.0434 | 4.63 | 27 |
| 50% | 18.17 | 0.045 | 4.63 | 26 |

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

The invention claimed is:

1. An optical amplifier, with an input and an output, for amplifying an information signal, the amplifier having:
   a doped fiber amplifying medium having an input coupling to the input of the amplifier and an output coupling to the output of the amplifier and exhibiting a gain characteristic and tilt characteristic as a function of length of the fiber, the tilt characteristic having a minimum value;
   a first pump coupling to the input of the amplifying medium, for generating a co-propagating pump signal of a first wavelength;
   a second pump coupling to the output of the amplifying medium, for generating a counter-propagating pump signal of a second wavelength;
   CHARACTERIZED BY:
   a frequency selective reflector, disposed along the amplifying medium to form first and second portion lengths, the reflector being able to reflect substantially all of the counter-propagating pump signal and the ratio of the first portion length to the second portion length being adjusted to shift the tilt characteristic with respect to the gain characteristic so that the minimum value coincides with a region of high gain.

2. The optical amplifier as recited in claim 1, wherein the wavelength of the first pump signal is shorter than the wavelength of the second pump signal.

3. The optical amplifier as recited in claim 2, wherein the first portion length of the amplifying medium is less than the second portion length.

4. The optical amplifier as recited in claim 2, wherein the reflector is a reflective fiber grating.

5. The optical amplifier as recited in claim 4, wherein the first and second pumps are coupled to the amplifying medium by wavelength multiplexers.

6. The optical amplifier as recited in claim 4, wherein the first pump signal wavelength is approximately 980 nm, the second pump signal wavelength is approximately 1480 nm, and the dopant in the doped fiber is erbium.

7. An optical transmission system having an optical transmitter and an optical receiver, the system including an optical amplifier, with an input coupling to the transmitter and an output coupling to the receiver, for amplifying an information signal from the transmitter, the amplifier having:
   a doped fiber amplifying medium having an input coupling to the input of the amplifier and an output coupling to the output of the amplifier and exhibiting a gain characteristic and tilt characteristic as a function of length of the fiber, the tilt characteristic having a minimum value;
   a first pump coupling to the input of the amplifying medium, for generating a co-propagating pump signal of a first wavelength;
   a second pump coupling to the output of the amplifying medium, for generating a counter-propagating pump signal of a second wavelength;
   CHARACTERIZED BY:
   a frequency selective reflector, disposed along the amplifying medium to form first and second portion lengths, the reflector being able to reflect substantially all of the counter-propagating pump signal and the ratio of the first portion length to the second portion length being adjusted to shift the tilt characteristic with respect to the gain characteristic so that the minimum value coincides with a region of high gain.

8. The optical amplifier as recited in claim 7, wherein the wavelength of the first pump signal is shorter than the wavelength of the second pump signal.

9. The optical amplifier as recited in claim 8, wherein the first portion length of the amplifying medium is less than the second portion length.

10. The optical system as recited in claim 8, wherein the reflector is a reflective fiber grating.

11. The optical system as recited in claim 10, wherein the first and second pumps are coupled to the amplifying medium by wavelength multiplexers.

12. The optical amplifier as recited in claim 11, further characterized by optical isolators disposed between the transmitter and the input of the amplifier and between the output of the amplifier and the receiver.

13. The optical system as recited in claim 12, wherein the first pump signal wavelength is approximately 980 nm, the second pump signal wavelength is approximately 1480 nm, and the dopant in the doped fiber is erbium.

* * * * *